(12) United States Patent
Xi et al.

(10) Patent No.: US 10,013,938 B2
(45) Date of Patent: Jul. 3, 2018

(54) DISPLAY PANEL AND DISPLAY DEVICE, AND FABRICATION METHOD THEREOF

(71) Applicants: Shanghai AVIC OPTO Electronics Co., Ltd., Shanghai (CN); Tianma Micro-electronics Co., Ltd., Shenzhen (CN)

(72) Inventors: Kerui Xi, Shanghai (CN); Tingting Cui, Shanghai (CN)

(73) Assignees: Shanghai AVIC OPTO Electronics Co., Ltd., Shanghai (CN); Tianma Micro-electronics Co., Ltd., Shenzhen (CN)

( * ) Notice: Subject to any disclaimer, the term of this patent is extended or adjusted under 35 U.S.C. 154(b) by 146 days.

(21) Appl. No.: 15/184,165

(22) Filed: Jun. 16, 2016

(65) Prior Publication Data

US 2017/0249915 A1 Aug. 31, 2017

(30) Foreign Application Priority Data

Feb. 29, 2016 (CN) .......................... 2016 1 0112692

(51) Int. Cl.
*G09G 3/36* (2006.01)
*G09G 3/20* (2006.01)
*G02F 1/133* (2006.01)

(52) U.S. Cl.
CPC ........... *G09G 3/3648* (2013.01); *G02F 1/133* (2013.01); *G09G 3/2003* (2013.01); *G09G 3/3607* (2013.01); *G09G 2300/0426* (2013.01)

(58) Field of Classification Search
USPC ........................................................ 345/174
See application file for complete search history.

(56) References Cited

U.S. PATENT DOCUMENTS

| | | | |
|---|---|---|---|
| 9,810,955 B2 * | 11/2017 | Zheng | G02F 1/134309 |
| 2006/0103940 A1 | 5/2006 | Lo et al. | |
| 2009/0309821 A1 | 12/2009 | Tanno | |
| 2015/0302808 A1 * | 10/2015 | Wang | G02F 1/1335 345/691 |
| 2016/0246123 A1 * | 8/2016 | Zheng | G02F 1/133509 |

FOREIGN PATENT DOCUMENTS

| | | |
|---|---|---|
| CN | 102289123 A | 12/2011 |
| CN | 103424916 A | 12/2013 |
| CN | 103728801 A | 4/2014 |
| CN | 104360549 A | 2/2015 |

* cited by examiner

*Primary Examiner* — Van N Chow
(74) *Attorney, Agent, or Firm* — Anova Law Group, PLLC (57) ABSTRACT

A display panel includes an array substrate and a color film substrate. The array substrate includes a plurality of pixel groups each including at least two sub-pixels, and a plurality of electrodes configured to provide driving electric fields for display of each sub-pixel. On the array substrate, neighboring pixel groups form a plurality of first gaps extending along a first direction and a plurality of second gaps extending along a second direction. The color film substrate includes a black matrix and a plurality of color filters. The black matrix shields the first gaps and the second gaps but non-overlaps with gaps between neighboring sub-pixels in a same pixel group. A distance from an edge of an electrode corresponding to a sub-pixel to an edge of a color filter corresponding to the same sub-pixel along a direction parallel to the array substrate is greater than or equal to a pre-determined distance.

19 Claims, 8 Drawing Sheets

DISPLAY PANEL AND DISPLAY DEVICE, AND FABRICATION METHOD THEREOF

CROSS-REFERENCES TO RELATED APPLICATIONS

This application claims the priority of Chinese patent application No. 201610112692.8, filed on Feb. 29, 2016, the entirety of which is incorporated herein by reference.

FIELD OF THE DISCLOSURE

The present disclosure generally relates to the field of display technology and, more particularly, relates to a display panel and a display device, and fabrication process thereof.

BACKGROUND

A liquid crystal display (LCD) panel often includes an upper substrate, a lower substrate, and a liquid crystal layer located between the two substrates. The upper substrate may be a color film (CF) substrate, while the lower substrate may be a thin-film transistor (TFT) array substrate. In a traditional liquid crystal display monitor, the CF substrate and the TFT array substrate are bonded together by frame glue to form a display panel.

Figure 1:
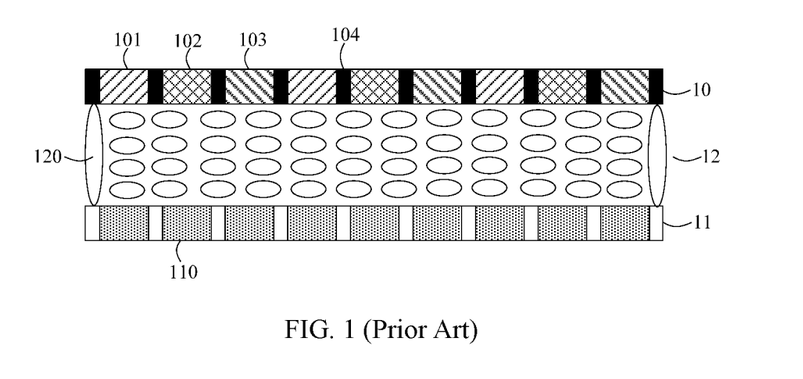
FIG. 1 illustrates a schematic view of a conventional liquid crystal display device.

FIG. 1 shows a schematic view of the structure of a traditional liquid crystal display (LCD) device. Referring to FIG. 1, the LCD device includes a CF substrate 10, a TFT array substrate 11, and a liquid crystal layer 12 located between the CF substrate 10 and the array substrate 11. The array substrate 11 may include a plurality of pixel units arranged as an array with each pixel unit further including three sub-pixel units 110. The CF substrate 10 may include a red color filter 101, a green color filter 102, and a blue color filter 103 corresponding to each of the three sub-pixel units 110. In addition, the CF substrate further includes a black matrix (BM) 104 between neighboring color filters. Specifically, the BM 104 corresponds to the positions that shield the gaps between neighboring sub-pixel units 110.

Figure 2:
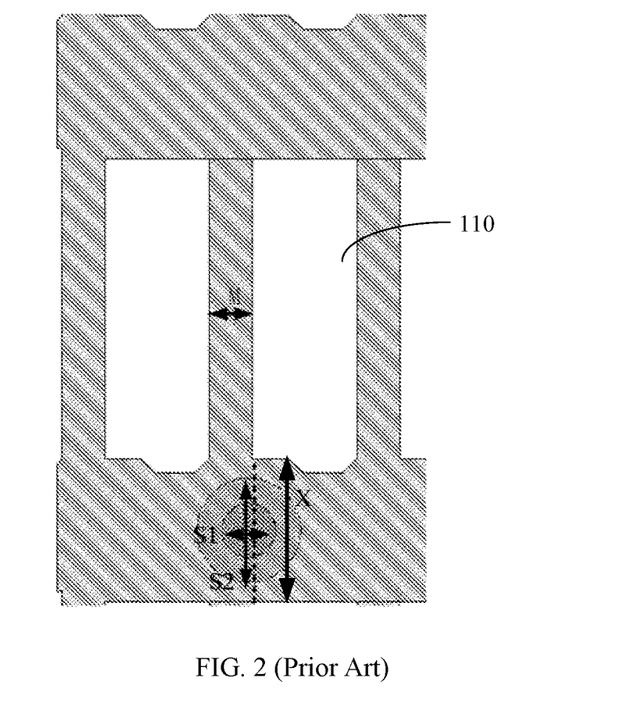
FIG. 2 illustrates a schematic view of a part of an array substrate in the liquid crystal display device shown in FIG. 1.

As the resolution of display devices becomes higher and higher, the size of sub-pixel units 110 on a display panel with a same dimension becomes smaller and smaller. FIG. 2 shows a schematic diagram of a part of the array substrate 11 shown in FIG. 1. As shown in FIG. 2, due to the limitations of the fabrication process for the CF substrate 10, the minimum line-width M of the BM is usually no less than 5.5 μm. On the other hand, due to the restrictions on the bottom dimension S1 and the top dimension S2 of the supporting columns 120 in the liquid crystal layer 12, the line-width X of the BM to cover the supporting columns 120 may not be smaller than 20 μm. Therefore, when the line-width M of the BM and the line-width X for covering the supporting columns both reach a minimum value, further improving the resolution by reducing the dimension of the sub-pixel units 110 may lead to a low product yield and a low transmission rate for the display devices.

The disclosed display panels, display devices, and the fabrication methods are directed to solve one or more problems set forth above and other problems in the art.

BRIEF SUMMARY OF THE DISCLOSURE

One aspect of the present disclosure includes a display panel. The display panel includes an array substrate and a color film substrate. The array substrate includes a plurality of pixel groups with each including at least two sub-pixels. The array substrate also includes a plurality of electrodes configured to provide driving electric fields for display of each sub-pixel. Further, a plurality of first gaps extends along a first direction between neighboring pixel groups on the array substrate and a plurality of second gaps extends along a second direction between neighboring pixel groups on the array substrate. The first direction and the second direction form an angle with each other. The color film substrate includes a black matrix and a plurality of color filters. The black matrix on the color film substrate shields the first gaps and the second gaps on the array substrate. The black matrix does not overlap with any portion of gaps between neighboring sub-pixels in a same pixel group on the array substrate. Moreover, a distance from an edge of an electrode corresponding to a sub-pixel to an edge of a color filter corresponding to the same sub-pixel along a direction parallel to the array substrate is greater than or equal to a pre-determined distance.

Another aspect of the present disclosure provides a display device. The display device includes a display panel described in the present disclosure.

Another aspect of the present disclosure provides a method for fabricating a display panel described in the present disclosure. The fabrication method includes forming an array substrate including a plurality of pixel groups with each including at least two sub-pixels, and a plurality of electrodes configured to provide driving electric fields for display of each sub-pixel. On the array substrate, a plurality of first gaps between neighboring pixel groups extends along a first direction and a plurality of second gaps between neighboring pixel groups extends along a second direction. The first direction and the second direction form an angle with each other. The fabrication method also includes forming a color film substrate including a black matrix and a plurality of color filters. The black matrix on the color film substrate shields the first gaps and the second gaps on the array substrate. The black matrix does not overlap with any portion of gaps between neighboring sub-pixels in a same pixel group on the array substrate. Moreover, a distance from an edge of an electrode corresponding to a sub-pixel to an edge of a color filter corresponding to the same sub-pixel along a direction parallel to the array substrate is greater than or equal to a pre-determined distance.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

The present disclosure provides a display panel. The display panel includes an array substrate and a CF substrate. In one embodiment, the display panel is an LCD panel and, thus, the display panel also includes a liquid crystal layer located between the array substrate and the CF substrate. However, the type of the display panel is not limited to the LCD type. In other embodiments, the display panel may also be an organic light-emitting diode (OLED) panel, or any other suitable type of display panel.

Figure 3:
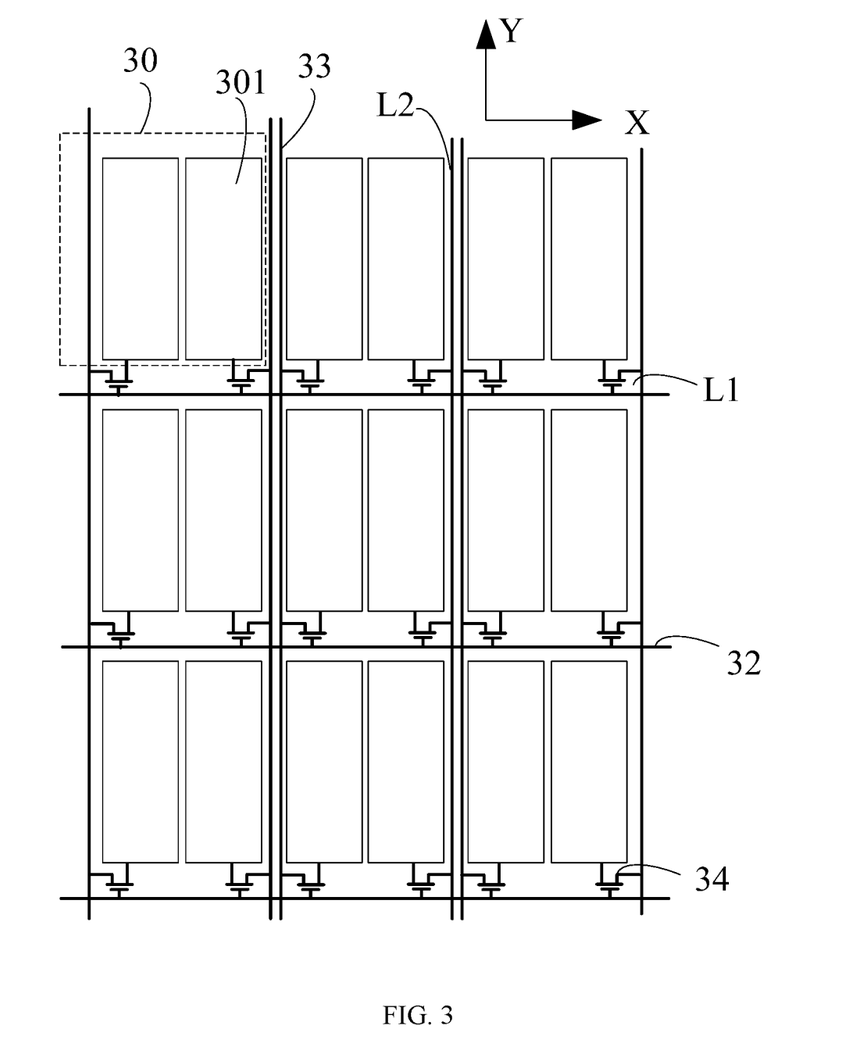
FIG. 3 illustrates a schematic top-view of an exemplary array substrate consistent with disclosed embodiments.

FIG. 3 shows a schematic top-view of an exemplary array substrate consistent with disclosed embodiments. Referring to FIG. 3, the array substrate includes an array of pixels, also referred to as a pixel array. The pixel array includes a plurality of pixel groups 30. Each pixel group 30 may further include at least two sub-pixels 301. In addition, a plurality of first gaps L1 extending along a first direction X and a plurality of second gaps L2 extending along a second direction Y exist between neighboring pixel groups 30. The first direction X and the second direction Y are perpendicular to each other. Specifically, when the sub-pixels in the pixel array are arranged in a matrix, the first direction X and the second direction Y are perpendicular to each other. Although the present disclosure is described primarily to have the first direction X and the second direction Y perpendicular to each other, the angle made by the first direction X and the second direction Y may be any desired angle. For example, when the shape of the sub-pixels 301 is a parallelogram, the angle between the first direction X and the second direction Y may not be about 90 degrees.

Optionally, the pixel array may include at least three sub-pixels 301 corresponding to color filters for different colors and arranged sequentially and repeatedly along the first direction X as well as along the second direction Y.

Figure 4:
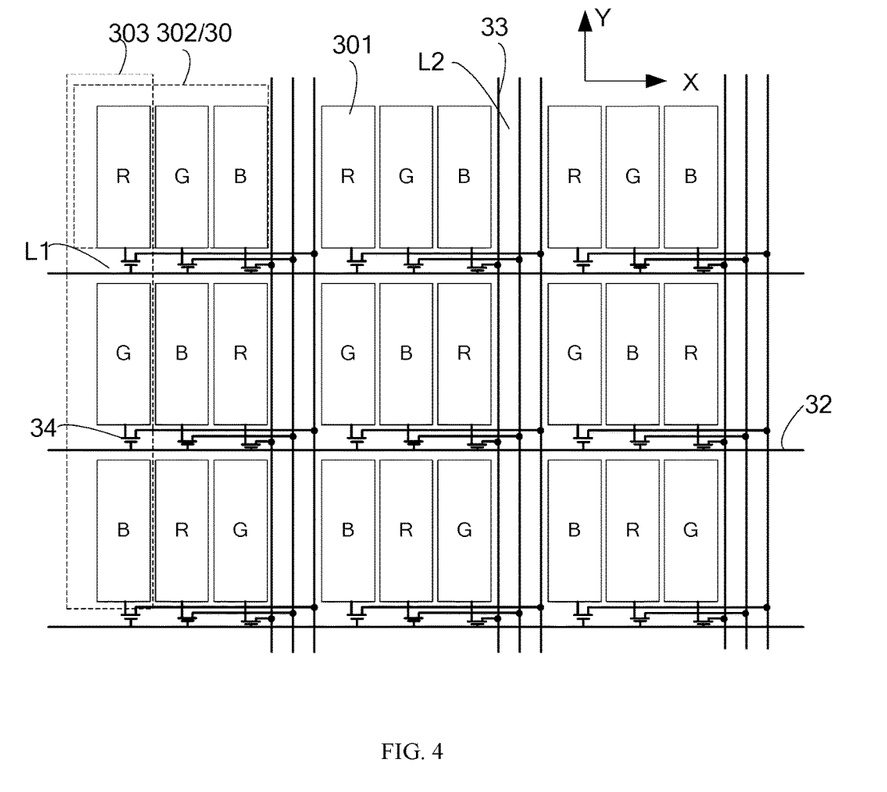
FIG. 4 illustrates a schematic view of an exemplary pixel array consistent with disclosed embodiments.

For example, FIG. 4 shows a schematic view of another exemplary pixel array consistent with the disclosed embodiments. Referring to FIG. 4, the pixel array includes a plurality of first sub-pixel units 302 arranged sequentially and repeatedly along a first direction X and a plurality of second sub-pixel units 303 arranged sequentially and repeatedly along a second direction Y. Further, each first sub-pixel unit includes a sub-pixel corresponding to a red color filter R, a sub-pixel corresponding to a green color filter G, and a sub-pixel corresponding to a blue color filter B; while each second sub-pixel unit 303 also includes a sub-pixel corresponding to a red color filter R, a sub-pixel corresponding to a green color filter G, and a sub-pixel corresponding to a blue color filter B.

In addition, the first sub-pixel units 302 and the second sub-pixel units 303 are arranged overlapping with each other. For example, a sub-pixel 301 in a first sub-pixel unit 302 that corresponds to a red color filter R may be a same sub-pixel 301 that corresponds to a red color filter R in a second sub-pixel unit 302. That is, a sub-pixel 301 corresponding to a red color filter R may be simultaneously considered as a sub-pixel 301 in a first sub-pixel unit 302 and also a sub-pixel 301 in a second sub-pixel unit 303. Similarly, a sub-pixel 301 in a first sub-pixel unit 302 that corresponds to a green color filter G may also be a same sub-pixel 301 that corresponds to a green color filter G in a second sub-pixel unit 302; while a sub-pixel 301 in a first sub-pixel unit 302 that corresponds to a blue color filter B may be a same sub-pixel 301 that corresponds to a blue color filter B in a second sub-pixel unit 302.

Based on the above arrangement, in one embodiment, each first sub-pixel unit 302 may be set as a pixel group 30. As shown in FIG. 4, a BM is arranged between neighboring first sub-pixel units 302 to cover first gaps L1 and second gaps L2 between neighboring first sub-pixel units 302 as well as scanning lines 32 in the first gaps L1 and data lines 33 in the second gaps L2. In certain embodiments, each second sub-pixel unit 303 may be set as a pixel group 30. Similarly, a BM may be arranged between neighboring second sub-pixel units 303.

Figure 5:
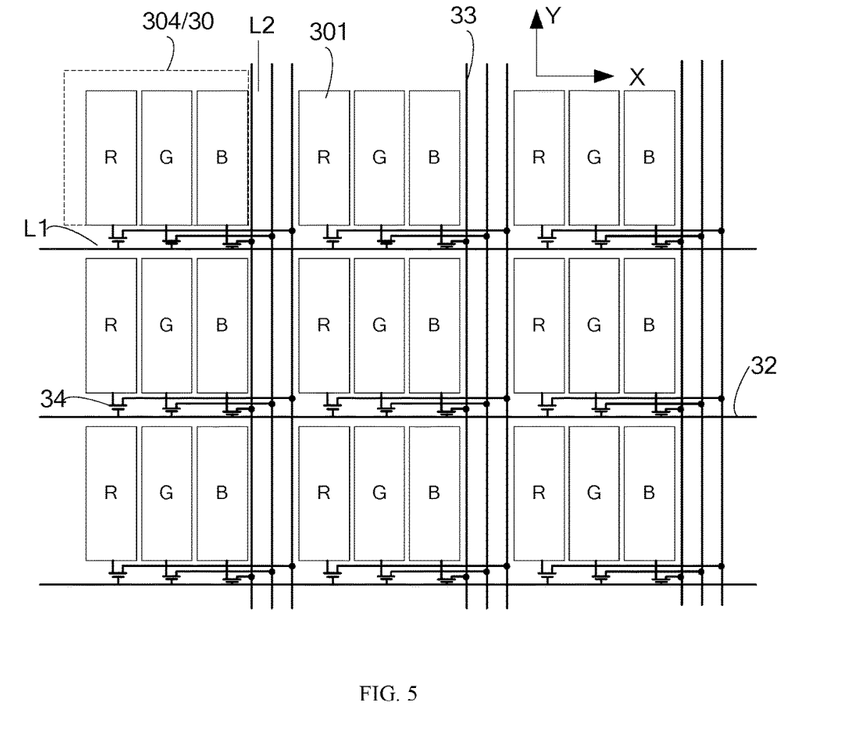
FIG. 5 illustrates a schematic view of another exemplary pixel array consistent with disclosed embodiments.

Alternatively, FIG. 5 shows a schematic view of another pixel array consistent with disclosed embodiments. Referring to FIG. 5, a plurality of sub-pixel units 304 are arranged along both a first direction X and a second direction Y. Each sub-pixel unit 304 includes three subsequently arranged subpixels corresponding to a red color filter R, a green color filter G, and a blue color filter B, respectively.

Based on the arrangement in FIG. 5, in one embodiment, a sub-pixel unit 304 may be set as a pixel group 30. Correspondingly, a BM may be arranged between neighboring sub-pixel units 304 to cover first gaps L1 and second gaps L2 between neighboring sub-pixel units 304 as well as scanning lines 32 in the first gaps L1 and data lines 33 in the second gaps L2.

In one embodiment, the color of the color filter that a sub-pixel 301 in a pixel group 30 corresponds to may not be specified. That is, the sub-pixels 301 in a single pixel group 30 may correspond to color filters for different colors, or some of the sub-pixels 301 in a pixel group may correspond to color filters for a same color while the others may correspond to color filters for one or more other colors.

Figure 6:
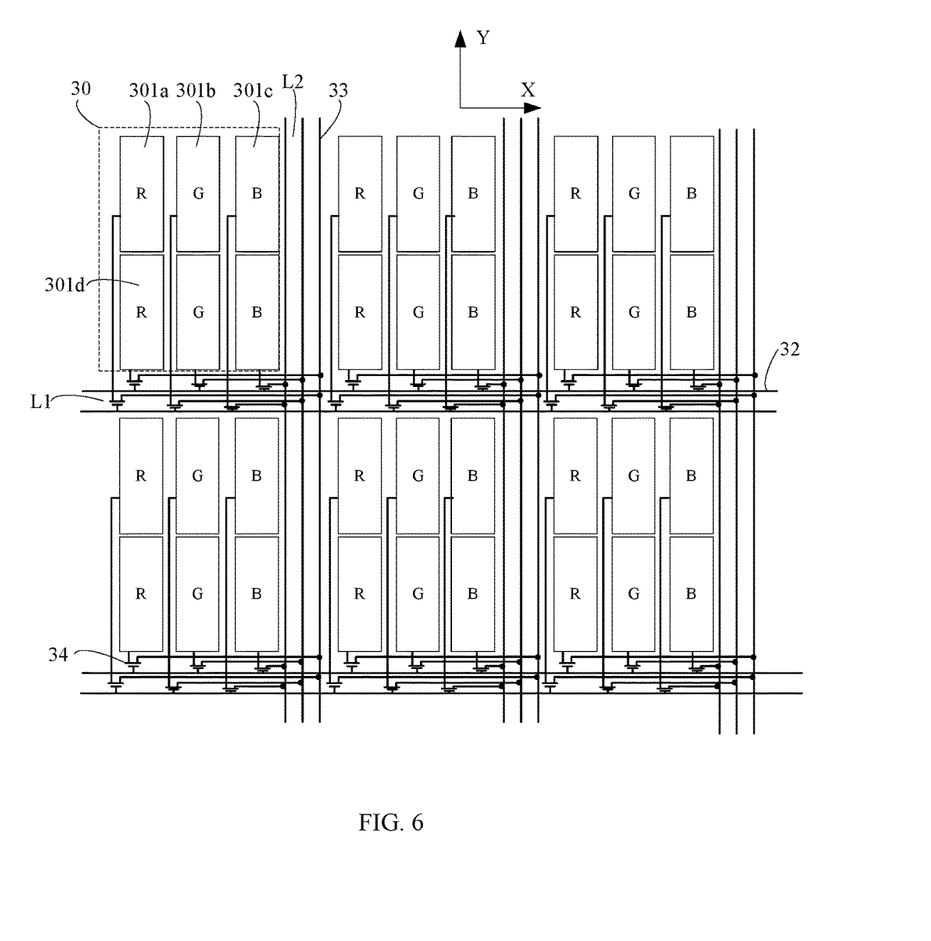
FIG. 6 illustrates a schematic view of another exemplary pixel array consistent with disclosed embodiments.

For example, FIG. 6 shows an exemplary pixel array consistent with the disclosed embodiments. Referring to FIG. 6, the three sub-pixels arranged sequentially along a first direction X in a pixel group 30, i.e. 301a, 301b, and 301c, correspond to color filters for different colors; while the two sub-pixels arranged sequentially along a second direction Y in a pixel group 30, i.e. 301a and 301d, correspond to color filters for a same color. Specifically, sub-pixel 301a corresponds to a red color filter R, sub-pixel 301b corresponds to a green color filter G, sub-pixel 301c corresponds to a blue color filter B, and sub-pixel 301d corresponds to a red color filter R.

Figure 7:
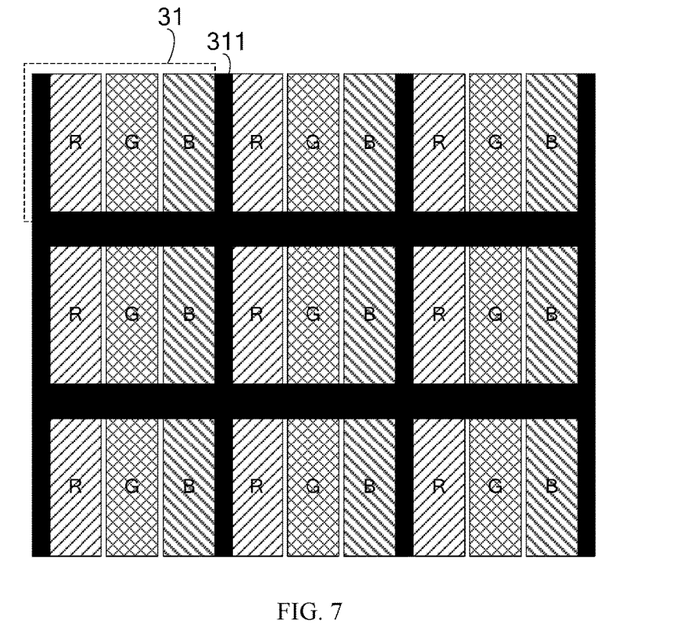
FIG. 7 illustrates a schematic top-view of an exemplary color film substrate consistent with disclosed embodiments.

In one embodiment, CF substrate includes an array of color filters. FIG. 7 shows a schematic top-view of an exemplary CF substrate consistent with disclosed embodiments. Referring to FIG. 7, the color filter array may include a plurality of color filter unit 31. Each color filter unit 31 may further include at least two color filters. Each color filter in a color filter unit 31 may be a read color filter R, a green color filter G, or a blue color filter B. Each color filter unit 31 on the CF substrate may be arranged in coordination with a corresponding pixel group 30 on the array substrate with the color filters in the color filter unit 31 corresponding to sub-pixels 301 in the pixel group 30. For example, color filter unit 31 shown in FIG. 7 may be arranged to correspond to pixel group 30 shown in FIG. 6. Specifically, the red color filter in color filter unit 31 may correspond to sub-pixel 301a in pixel group 30, the green color filter in color filter unit 31 may correspond to sub-pixel 301b in pixel group 30, while the blue color filter in color filter unit 31 may correspond to sub-pixel 301c in pixel group 30.

Further, a BM 311 may be arranged between neighboring color filter units 31. The BM 311 on the CF substrate corresponds to positions that shield the first gaps L1 and the second gaps L2 between neighboring pixel groups 30 on the array substrate so that light leaking from the first gaps L1 or from the second gaps L2 may be prevented. That is, both the first gaps L1 and the second gaps L2 on the array substrate between neighboring pixel groups 30 are covered by the BM 311 arranged on the CF substrate. The BM 311 may be made of an opaque resin or any other appropriate nontransparent material.

In one embodiment, the BM is not arranged between R/G/B color filters in a same color filter unit 31. That is, the BM does not cover any part between neighboring sub-pixels 301 in a same pixel group 30. Therefore, the gaps between neighboring color filters, such as between R and G and between G and B, in a single color filter unit 31 may be relatively narrow; correspondingly, the gaps between neighboring sub-pixels 301 in a single pixel group 30 may also be reduced. As such, for a display panel with fixed dimensions, the area saved due to reducing the gaps may be used to arrange more sub-pixels 301 and color filters R/G/B. Therefore, by using the disclosed CF substrate and array substrate, the resolution of the display panel, the CF substrate fabrication yield, and the transmission rate of pixels may all be improved without reducing the size of sub-pixels 301, reducing the minimum linewidth M of the BM 311, or rearranging the color filters R/G/B.

According to the disclosed embodiments, the gaps between neighboring sub-pixels 301 in a single pixel group 30 may be reduced, thus scanning lines 32, data lines 33, and thin film transistors 34 may not be able to fit in the gaps between sub-pixels 301 in each single pixel group 30. In one embodiment, the data lines 33 and the scanning lines 32 are arranged in the first gaps L1 and/or the second gaps L2 between neighboring pixel groups 30.

As shown in FIGS. 3-6, scanning lines 32 to provide scanning signals to sub-pixels 301 in a same pixel group 30 may be arranged in the first gaps L1; while the data lines 33 to provide gray scale signals to sub-pixels 301 in a same pixel group 30 may be arranged in the second gaps L2. Of course, scanning lines 32 in a same first gap L1 are electrically isolated from each other, while data lines 33 in a same second gap L2 are also electrically isolated from each other to avoid confusion in sub-pixel signals.

Further, gray scale signals in the data lines 33 may be transmitted to the corresponding sub-pixels 301 through thin film transistors 34. Scanning signals in the scanning lines 32 may be used to control the switching of the thin film transistors 34 between an on status and an off status. Specifically, the gate electrode of a thin film transistor 34 is connected to a corresponding scanning line 32, the source of the thin film transistor is connected to a corresponding data line 33, while the drain of the thin film transistor is connected to the pixel electrode of a corresponding sub-pixel 301. With the scanning lines 32 and the data lines 33 lying in the first gaps L1 and the second gaps L2, respectively, the positions for the scanning lines 32, the data lines 33, and the thin film transistors 34 may not be further specified. One may arrange the exact positions of the scanning lines 32, the data lines 33, and the thin film transistors 34 based on the structural design of the pixel array.

Further, in one embodiment, the array substrate may further include a plurality of electrodes used to provide driving electric fields for the display of the sub-pixels 301. The driving electric field may be applied along a direction perpendicular to or nearly perpendicular to the array substrate. Each sub-pixel 301 corresponds to a pair of electrodes that may be used to provide a driving electric field for the display of the sub-pixel 301. Moreover, along a direction parallel to the array substrate, a distance between the edge of the electrodes corresponding to a sub-pixel 301 and the edge of the color filter R/G/B corresponding to the same sub-pixel 301 may be greater than or equal to a pre-determined distance.

The pair of the electrodes used to provide a driving electric field for the display of each sub-pixel 301 may include a pixel electrode and a common electrode. Each pixel electrode uniquely corresponds to one sub-pixel 301, while a common electrode layer covers all the sub-pixels 301 and serves as the common electrode for all the sub-pixels 301. Alternatively, the common electrode layer may include multiple independent common electrodes with each common electrode corresponding to a plurality of sub-pixels 301. The electric voltage applied on each sub-pixel 301 is the voltage difference between the voltage on the corresponding pixel electrode and the voltage on the corresponding common electrode. The voltage difference may provide a driving electric field to drive the liquid crystals corresponding to the sub-pixel 301 to rotate. As the liquid crystals rotate under the application of the driven electric field, light may be transmitted through the display panel. The transmitted light may then demonstrate red, green, and blue colors after passing through the color filters R/G/B, respectively. Moreover, according to the principle of three primary colors, the three colors, i.e. red, green, and blue, may then be mixed to display various colors on the display panel.

In one embodiment, because no BM is arranged between sub-pixels 301 in a same pixel group 30, the driving electric fields for neighboring sub-pixels 301 are required to be independent from each other without overlapping in order to avoid color mixing between the sub-pixels 301 in the same pixel group 30. The distance between the edge of the electrode and the edge of the color filter R/G/B corresponding to a same sub-pixel 301 along the direction parallel to the array substrate may need to be specified in order to ensure the absence of overlapping between the driving electric fields for neighboring sub-pixels 301. Specifically, the distance may be greater than or equal to a pre-determined distance.

For illustration purposes, the present disclosure is described to have each pixel group 30 include a first sub-pixel 301a and a second sub-pixel 301b, although any number of sub-pixels, more or less than two, may be included in a pixel group. In any cases, for each sub-pixel in the pixel group, the distance between the edge of the corresponding electrode on the array substrate and the edge of the corresponding color filter on the CF substrate along the direction parallel to the array substrate is greater than or equal to a pre-determined distance.

Figure 8:
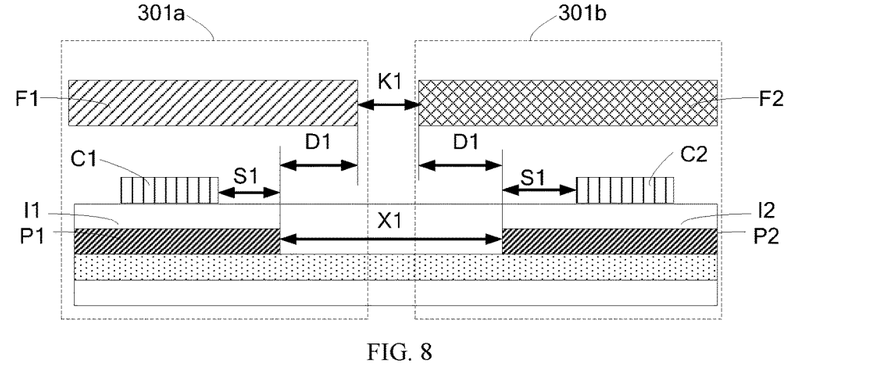
FIG. 8 illustrates a schematic cross-section view of a first sub-pixel unit and a second sub-pixel consistent with disclosed embodiments.

FIG. 8 shows a schematic cross-section view of a first sub-pixel unit and a second sub-pixel in an exemplary sub-pixel structure consistent with disclosed embodiments. Referring to FIG. 8, the first sub-pixel 301a further includes a first pixel electrode P1, a first insulating layer I1 formed on the first pixel electrode P1, and a first common electrode C1 formed on the surface of the first insulating layer I1. The first sub-pixel 301a corresponds to a first color filter F1 on the CF substrate. The first color filter may be a red color filter, a green color filter, or a blue color filter.

Along the direction parallel to the array substrate, the distance from the edge of the first common electrode C1 to the edge of the first color filter F1 and the distance from the edge of the first pixel electrode P1 to the edge of the first color filter F1 are both larger than or equal to the predetermined distance. That is, the distance between the edge of the first common electrode C1 and the edge of the first color filter F1, i.e. S1+D1, is no less than the pre-determined distance; while the distance between the edge of the first pixel electrode P1 and the edge of the first color filter F1, i.e. D1, is no less than the pre-determined distance.

The second sub-pixel 301b further includes a second pixel electrode P2, a second insulating layer I2 formed on the second pixel electrode P2, and a second common electrode C2 formed on the surface of the second insulating layer I2. The second sub-pixel 301b corresponds to a second color filter F2 on the CF substrate. The second color filter may be a red color filter, a green color filter, or a blue color filter. Optionally, the color of the second color filter F2 may be different from the color of the first color filter F1.

Along the direction parallel to the array substrate, the distance from the edge of the second common electrode C2 to the edge of the second color filter F2 and the distance from the edge of the second pixel electrode P2 to the edge of the second color filter F2 are both greater than or equal to the predetermined distance. That is, the distance between the edge of the second common electrode C2 and the edge of the second color filter F2, i.e. S1+D1, is no less than the pre-determined distance; while the distance between the edge of the second pixel electrode P2 and the edge of the second color filter F2, i.e. D1, is no less than the pre-determined distance.

In the sub-pixel structure shown in FIG. 8, the first common electrode C1 overlaps with the first pixel electrode P1, the second common electrode C2 overlaps with the second pixel electrode P2, the first common electrode C1 overlaps with the first color filter F1, and the second common electrode C2 also overlaps with the second color filter F2. Further, neither the first common electrode C1 nor the second common electrode C2 overlaps with the gap K1 between the first color filter F1 and the second color filter F2. That is, the gap K1 between the first color filter F1 and the second color filter F2 does not correspond to any part of the first common electrode C1; while the gap K1 between the first color filter F1 and the second color filter F2 does not correspond to any part of the second common electrode C2 either. In addition, neither the first pixel electrode P1 nor the second pixel electrode P2 overlaps with the gap K1 between the first color filter F1 and the second color filter F2. That is, the gap K1 between the first color filter F1 and the second color filter F2 does not correspond to any part of the first pixel electrode P1; while the gap K1 between the first color filter F1 and the second color filter F2 does not correspond to any part of the second pixel electrode P2 either.

Further, in the sub-pixel structure shown in FIG. 8, the pre-determined distance may be about 1.5 µm. Along the direction parallel to the array substrate, the distance S1+D1 between the edge of the first common electrode C1 and the edge of the first color filter F1 may be in a range of about 3 µm-6 µm; the distance D1 between the edge of the first pixel electrode P1 and the edge of the first color filter F1 may be in a range of about 1.5 µm-3 µm; the distance S1+D1 between the edge of the second common electrode C2 and the edge of the second color filter F2 may be in a range of about 3 µm-6 µm; while the distance D1 between the edge of the second pixel electrode P2 and the edge of the second color filter F2 may be in a range of about 1.5 µm-3 µm. Moreover, the distance X1 between the edge of the first pixel electrode P1 and the edge of the second pixel electrode P2 along the direction parallel to the array substrate may be in a range of about 3.5 µm-6 µm. The distance K1 between the first color filter F1 and the second color filter F2 is given by K1=X1−2*D1.

Figure 9:
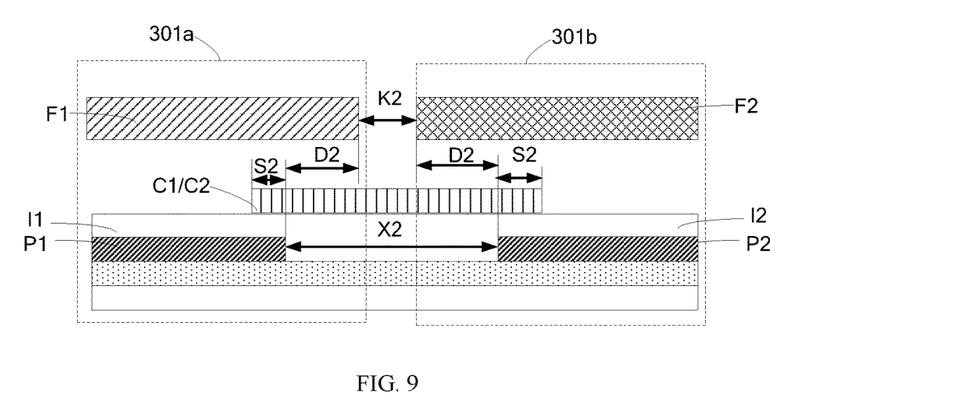
FIG. 9 illustrates another schematic cross-section view of a first sub-pixel unit and second sub-pixel consistent with disclosed embodiments.

FIG. 9 shows a schematic cross-section view of a first sub-pixel unit and a second sub-pixel in another exemplary sub-pixel structure consistent with disclosed embodiments. Referring to FIG. 9, the first common electrode C1 of the first sub-pixel 301a is also the second common electrode C2 of the second sub-pixel 301b. The common electrode C1/C2 overlaps with both the first pixel electrode P1 and the second pixel electrode P2. The common electrode C1/C2 also overlaps with both the first color filter F1 corresponding to the first sub-pixel 301a and the second color filter F2 corresponding to the second sub-pixel 301b. In addition, the common electrode C1/C2 also overlaps with the gap K2 between the first color filter F1 and the second color filter F2. Moreover, neither the first pixel electrode P1 nor the second pixel electrode P2 overlaps with the gap K2 between the first color filter F1 and the second color filter F2. That is, the gap K2 between the first color filter F1 and the second color filter F2 does not correspond to any part of the first pixel electrode P1 or any part of the second pixel electrode P2 either.

Further, in the sub-pixel structure shown in FIG. 9, the pre-determined distance may be about 1 µm. Along the direction parallel to the array substrate, the distance S2+D2 between the edge of the first common electrode C1 and the edge of the first color filter F1 may be in a range of about 2.5 µm-5 µm; the distance D2 between the edge of the first pixel electrode P1 and the edge of the first color filter F1 may be in a range of about 1 µm-2 µm; the distance S2+D2 between the edge of the second common electrode C2 and the edge of the second color filter F2 may be in a range of about 2.5 µm-5 µm; while the distance D2 between the edge of the second pixel electrode P2 and the edge of the second color filter F2 may be in a range of about 1 µm-2 µm. Moreover, the distance X2 between the edge of the first pixel electrode P1 and the edge of the second pixel electrode P2 along the direction parallel to the array substrate may be in a range of about 3.5 µm-5 µm. The distance K2 between the first color filter F1 and the second color filter F2 is given by K2=X2−2*D2.

Figure 10:
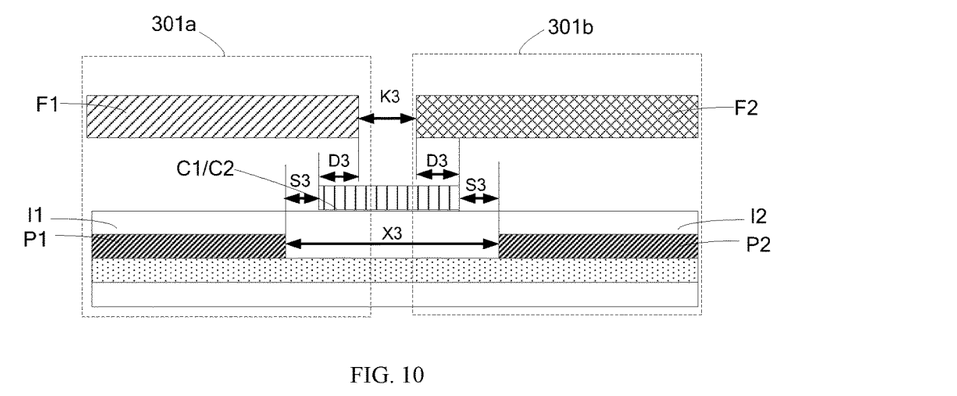
FIG. 10 illustrates another schematic cross-section view of a first sub-pixel unit and a second sub-pixel consistent with disclosed embodiments.

FIG. 10 shows a schematic cross-section view of a first sub-pixel unit and a second sub-pixel in yet another exemplary sub-pixel structure consistent with disclosed embodiments. Referring to FIG. 10, the first common electrode C1 of the first sub-pixel 301a is also the second common electrode C2 of the second sub-pixel 301b. The common electrode C1/C2 is not overlapping with either the first pixel electrode P1 or the second pixel electrode P2. However, the common electrode C1/C2 overlaps with both the first color filter F1 and the second color filter F2. In addition, the common electrode C1/C2 also overlaps with the gap K2 between the first color filter F1 and the second color filter F2. Moreover, neither the first pixel electrode P1 nor the second pixel electrode P2 overlaps with the gap K3 between the first color filter F1 and the second color filter F2. That is, the gap K3 between the first color filter F1 and the second color filter F2 does not correspond to any part of the first pixel electrode P1 or any part of the second pixel electrode P2.

Further, in the sub-pixel structure shown in FIG. 10, the pre-determined distance may be about 2.5 µm. Along the direction parallel to the array substrate, the distance D3 between the edge of the first common electrode C1 and the edge of the first color filter F1 may be in a range of about 2.5 µm-4 µm; the distance S3+D3 between the edge of the first pixel electrode P1 and the edge of the first color filter F1 may be in a range of about 2.5 µm-5.5 µm; the distance D3 between the edge of the second common electrode C2 and the edge of the second color filter F2 may be in a range of about 2.5 µm-4 µm; while the distance S3+D3 between the edge of the second pixel electrode P2 and the edge of the second color filter F2 may be in a range of about 2.5 µm-4 µm. Moreover, the distance X3 between the edge of the first pixel electrode P1 and the edge of the second pixel electrode P2 along the direction parallel to the array substrate may be in a range of about 3.5 µm-7 µm. The distance K3 between the first color filter F1 and the second color filter F2 is given by K3=X3−2*D3.

In the disclosed embodiments shown in FIGS. 8-10, the distance from the edge of the first common electrode C1 to the edge of the first color filter F1 equals to the distance from the edge of the second common electrode C2 to the edge of the second color filter F2, while the distance from the edge of the first pixel electrode P1 to the edge of the first color filter F1 also equals to the edge of the distance from the second pixel electrode P2 to the edge of the second color filter F2. In certain other embodiments, these dimensions may not always be the same. Specifically, the distance from the edge of the first common electrode C1 to the edge of the first color filter F1 may not equal to the distance from the edge of the second common electrode C2 to the edge of the second color filter F2 and/or the distance from the edge of the first pixel electrode P1 to the edge of the first color filter F1 may not equal to the edge of the distance from the second pixel electrode P2 to the edge of the second color filter F2.

Figure 11:
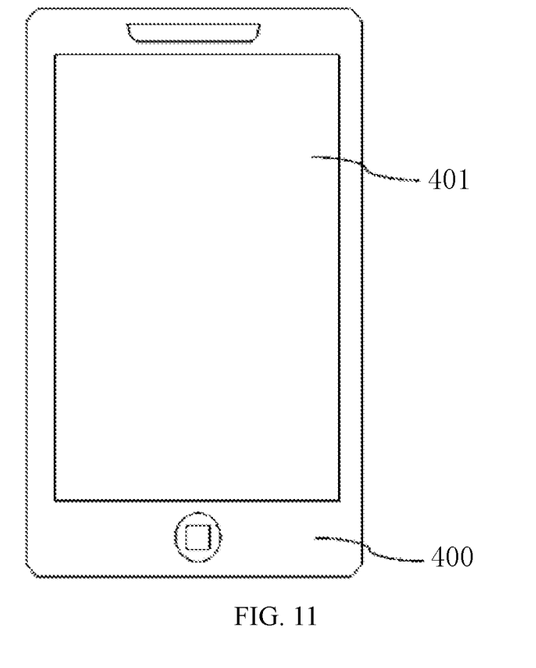
FIG. 11 illustrates an exemplary display device consistent with disclosed embodiments.

The present disclosure also provides a display device. The display device includes the disclosed display panel. As an example, shown in FIG. 11, a cellphone device 400 includes the above described display panel 401. In other embodiments, the disclosed display panel may also be adopted in devices with display screens, such as television, computer monitor, etc.

According to the disclosed display panel and display device, the pixel array on the array substrate may include a plurality of pixel groups with each pixel group further including at least two sub-pixels. In addition, the BM on the CF substrate corresponds to the positions that shield the gaps between neighboring pixel groups. That is, no BM is arranged between neighboring sub-pixels in a same pixel group. Thus, dimensions of gaps between sub-pixels in each pixel group may be reduced. Therefore, instead of reducing the size of sub-pixels, the resolution of the display panel may still be improved by arranging more sub-pixels on the display panel. As such, when the minimum linewidth M for the BM and/or the minimum linewidth X for covering the supporting columns are approached, the use of the disclosed display panel and display device may avoid the problems of getting a low product yield and/or a low transmission rate for the display panel due to reducing the size of the sub-pixels in order to improve the resolution of the display panel.

In addition, because for each sub-pixel, the distance from the edge of the corresponding electrode on the array substrate to the edge of the corresponding color filter on the CF substrate along the direction parallel to the array substrate is greater than or equal to a pre-determined distance, color mixing between sub-pixels in a same pixel group may be avoided despite the absence of BM between neighboring sub-pixels in the same pixel group. Therefore, the display quality of the display panel may not be affected.

The above detailed descriptions only illustrate certain exemplary embodiments of the present invention, and are not intended to limit the scope of the present invention. Those skilled in the art can understand the specification as whole and technical features in the various embodiments can be combined into other embodiments understandable to those persons of ordinary skill in the art. Any equivalent or modification thereof, without departing from the spirit and principle of the present invention, falls within the true scope of the present invention.

What is claimed is:

1. A display panel, comprising:
   an array substrate including a plurality of pixel groups each including at least two sub-pixels, and a plurality of electrodes configured to provide driving electric fields for display of each sub-pixel; and
   a color film substrate including a black matrix and a plurality of color filters,
   wherein:
   a plurality of first gaps between neighboring pixel groups on the array substrate are extending along a first direction, and a plurality of second gaps between neighboring pixel groups on the array substrate are extending along a second direction,
   the first direction and the second direction form an angle with each other,
   the first gaps and the second gaps on the array substrate correspond to the black matrix and are shielded by the black matrix arranged on the color film substrate,
   along a direction perpendicular to the array substrate, the black matrix on the color film substrate does not overlap with any gaps between neighboring sub-pixels in a same pixel group on the array substrate, and
   along a direction parallel to the array substrate, a distance from an edge of an electrode corresponding to a sub-pixel to an edge of a color filter corresponding to the same sub-pixel is greater than or equal to a pre-determined distance,
   wherein:
   each pixel group includes a first sub-pixel and a second sub-pixel adjacent to the first sub-pixel,
   the first sub-pixel corresponds to a first color filter disposed on the color film substrate and includes a first pixel electrode, a first insulating layer on the first pixel electrode, and a first common electrode on the first insulating layer,
   the second sub-pixel corresponds to a second color filter disposed on the color film substrate and includes a second pixel electrode, a second insulating layer on the second pixel electrode, and a second common electrode on the second insulating layer, the second color filter having a color different from the first color filter,
   along the direction parallel to the array substrate, a distance from an edge of the first common electrode to an edge of the first color filter and a distance from an edge of the first pixel electrode to the edge of the first color filter are both greater than or equal to the pre-determined distance, and along the direction parallel to the array substrate, a distance from an edge of the second common electrode to an edge of the second color filter and a distance from an edge of the second pixel electrode to the edge of the second color filter are both greater than or equal to the pre-determined distance.

2. The display panel according to claim 1, wherein:
the array substrate includes at least three sub-pixels corresponding to color filters for different colors, and
at least three sub-pixels are arranged along the first direction and along the second direction.

3. The display panel according to claim 2, wherein the sub-pixels included in a single pixel group correspond to color filters for different colors.

4. The display panel according to claim 2, wherein a first number of sub-pixels in a single pixel group correspond to color filters for a same color, while a second number of sub-pixels in the single pixel group correspond to color filters for different colors.

5. The display panel according to claim 1, wherein each color filter on the color film substrate is one of a red color filter, a green color filter, and a blue color filter.

6. The display panel according to claim 1, wherein the first direction and the second direction are perpendicular to each other.

7. The display panel according to claim 1, wherein a plurality of thin film transistors is arranged in the first gaps or in the second gaps.

8. The display panel according to claim 7, wherein:
each sub-pixel is associated with a thin film transistor, a data line, and a scanning line;
a gate of each thin film transistor is connected to a corresponding scanning line;
a source of each thin film transistor is connected to a corresponding data line; and
a drain of each thin film transistor is connected to a corresponding pixel electrode.

9. The display panel according to claim 1, wherein:
the first common electrode and the first pixel electrode overlap with each other and the second common electrode and the second pixel electrode overlap with each other;
the first common electrode and the first color filter overlap with each other and the second common electrode and the second color filter overlap with each other;
the first common electrode does not overlap with a gap between the first color filter and the second color filter, while the second common electrode does not overlap with the gap between the first color filter and the second color filter either; and
the first pixel electrode does not overlap with the gap between the first color filter and the second color filter, while the second pixel electrode does not overlap with the gap between the first color filter and the second color filter.

10. The display panel according to claim 9, wherein:
the pre-determined distance is about 1.5 μm;
along the direction parallel to the array substrate, the distance from the edge of the first common electrode to the edge of the first color filter is in a range of about 3μm-6 μm while the distance from the edge of the first pixel electrode to the edge of the first color filter is in a range of about 1.5 μm-3μm; and
along the direction parallel to the array substrate, the distance from the edge of the second common electrode to the edge of the second color filter is in a range of about 3 μm-6 μm, while the distance from the edge of the second pixel electrode to the edge of the second color filter is in a range of about 1.5 μm-3 μm.

11. The display panel according to claim 1, wherein:
the first common electrode and the second common electrode are a same common electrode;
the same common electrode overlaps with the first pixel electrode, the second pixel electrode, the first color filter, and the second color filter;
the same common electrode overlaps with the gap between the first color filter and the second color filter; and
the first pixel electrode does not overlap with the gap between the first color filter and the second color filter, while the second pixel electrode does not overlap with the gap between the first color filter and the second color filter either.

12. The display panel according to claim 11, wherein:
the pre-determined distance is about 1 μm;
along the direction parallel to the array substrate, the distance from the edge of the common electrode to the edge of the first color filter is in a range of about 2.5 μm-5 μm, while the distance from the edge of the first pixel electrode to the edge of the first color filter is in a range of about 1 μm-2 μm; and
along the direction parallel to the array substrate, the distance from the edge of the common electrode to the edge of the second color filter is in a range of about 2.5 μm-5 μm, while the distance from the edge of the second pixel electrode to the edge of the second color filter is in a range of about 1 μm-2 μm.

13. The display panel according to claim 1, wherein:
the first common electrode and the second common electrode are a same common electrode;
the same common electrode does not overlap with each of the first pixel electrode and the second pixel electrode;
the same common electrode overlaps with the first color filter and the second color filter;
the same common electrode overlaps with a gap between the first color filter and the second color filter; and
the first pixel electrode does not overlap with the gap between the first color filter and the second color filter, while the second pixel electrode does not overlap with the gap between the first color filter and the second color filter either.

14. The display panel according to claim 13, wherein:
the pre-determined distance is about 2.5 μm;
along the direction parallel to the array substrate, the distance from the edge of the common electrode to the edge of the first color filter is in a range of about 2.5 μm-4 μm, while the distance from the edge of the first pixel electrode to the edge of the first color filter is in a range of about 2.5 μm-5.5 μm; and
along the direction parallel to the array substrate, the distance from the edge of the common electrode to the edge of the second color filter is in a range of about 2.5 μm-4 μm, while the distance from the edge of the second pixel electrode to the edge of the second color filter is in a range of about 2.5 μm-5.5 μm.

15. The display panel according to claim 1, wherein:
a plurality of data lines is arranged in the first gaps to provide gray scale signals to corresponding sub-pixels in the pixel groups,
a plurality of scanning lines is arranged in the second gaps to provide scanning signals to corresponding sub-pixels in the pixel groups,
the data lines arranged in a same gap are electrically isolated from each other, and the scanning lines arranged in a same gap are electrically isolated from each other.

16. A display device comprising a display panel, wherein the display panel comprises:
an array substrate including a plurality of pixel groups each including at least two sub-pixels, and a plurality of electrodes configured to provide driving electric fields for display of each sub-pixel; and
a color film substrate including a black matrix and a plurality of color filters,
wherein:
a plurality of first gaps between neighboring pixel groups on the array substrate are extending along a first direction, and a plurality of second gaps between neighboring pixel groups on the array substrate are extending along a second direction,
the first direction and the second direction form an angle with each other,
the first gaps and the second gaps on the array substrate correspond to the black matrix and are shielded by the black matrix arranged on the color film substrate,
along a direction perpendicular to the array substrate, the black matrix on the color film does not overlap with any gaps between neighboring sub-pixels in a same pixel group on the array substrate, and
along a direction parallel to the array substrate, a distance from an edge of an electrode corresponding to a sub-pixel to an edge of a color filter corresponding to the same sub-pixel is greater than or equal to a pre-determined distance,
wherein:
each pixel group includes a first sub-pixel and a second sub-pixel adjacent to the first sub-pixel,
the first sub-pixel corresponds to a first color filter disposed on the color film substrate and includes a first pixel electrode, a first insulating layer on the first pixel electrode, and a first common electrode on the first insulating layer,
the second sub-pixel corresponds to a second color filter disposed on the color film substrate and includes a second pixel electrode, a second insulating layer on the second pixel electrode, and a second common electrode on the second insulating layer, the second color filter having a color different from the first color filter,
along the direction parallel to the array substrate, a distance from an edge of the first common electrode to an edge of the first color filter and a distance from an edge of the first pixel electrode to the edge of the first color filter are both greater than or equal to the pre-determined distance, and
along the direction parallel to the array substrate, a distance from an edge of the second common electrode to an edge of the second color filter and a distance from an edge of the second pixel electrode to the edge of the second color filter are both greater than or equal to the pre-determined distance.

17. A method for forming a display panel, comprising:
forming an array substrate including: a plurality of pixel groups each including at least two sub-pixels, and a plurality of electrodes configured to provide driving electric fields for display of each sub-pixel; and
forming a color film substrate including a black matrix and a plurality of color filters, wherein:
a plurality of first gaps between neighboring pixel groups on the array substrate are extending along a first direction and a plurality of second gaps between neighboring pixel groups on the array substrate are extending along a second direction,
the first direction and the second direction form an angle with each other,
the first gaps and the second gaps on the array substrate correspond to the black matrix and are shielded by the black matrix arranged on the color film substrate,
along a direction perpendicular to the array substrate, the black matrix on the color film substrate does not overlap with any gaps between neighboring sub-pixels in a same pixel group on the array substrate, and
along a direction parallel to the array substrate, a distance from an edge of an electrode corresponding to a sub-pixel to an edge of a color filter corresponding to the same sub-pixel is greater than or equal to a pre-determined distance,
wherein:
each pixel group includes a first sub-pixel and a second sub-pixel adjacent to the first sub-pixel,
the first sub-pixel corresponds to a first color filter disposed on the color film substrate and includes a first pixel electrode, a first insulating layer on the first pixel electrode, and a first common electrode on the first insulating layer,
the second sub-pixel corresponds to a second color filter disposed on the color film substrate and includes a second pixel electrode, a second insulating layer on the second pixel electrode, and a second common electrode on the second insulating layer, the second color filter having a color different from the first color filter,
along the direction parallel to the array substrate, a distance from an edge of the first common electrode to an edge of the first color filter and a distance from an edge of the first pixel electrode to the edge of the first color filter are both greater than or equal to the pre-determined distance, and
along the direction parallel to the array substrate, a distance from an edge of the second common electrode to an edge of the second color filter and a distance from an edge of the second pixel electrode to the edge of the second color filter are both greater than or equal to the pre-determined distance.

18. The method according to claim 17, wherein:
a plurality of data lines is arranged in the first gaps to provide gray scale signals to corresponding sub-pixels in the pixel groups,
a plurality of scanning lines is arranged in the second gaps to provide scanning signals to corresponding sub-pixels in the pixel groups,
the data lines arranged in a same gap are electrically isolated from each other, and
the scanning lines arranged in a same gap are electrically isolated from each other.

19. The method according to claim 17, further including:
configuring a liquid crystal layer between the array substrate and the color film substrate.

* * * * *